(12) United States Patent
Hoehn

(10) Patent No.: US 6,747,542 B1
(45) Date of Patent: Jun. 8, 2004

(54) SNAP-IN BLOW MOTOR SPEED CONTROL WITH BRAKEAWAY SERVICE FEATURE

(75) Inventor: Garrett Wade Hoehn, Kenmore, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/638,478

(22) Filed: Aug. 14, 2000

(51) Int. Cl.⁷ .............................................. H01H 13/00
(52) U.S. Cl. ......................... 338/50; 338/220; 361/728
(58) Field of Search ........................... 338/50, 51, 220, 338/221, 315; 361/728, 730, 752, 801

(56) References Cited

U.S. PATENT DOCUMENTS

| | | | | |
|---|---|---|---|---|
| 4,609,902 A | * | 9/1986 | Lenk | 337/30 |
| 4,890,198 A | * | 12/1989 | Beam et al. | 361/399 |
| 5,192,940 A | * | 3/1993 | Yajima et al. | 338/308 |
| 5,229,741 A | * | 7/1993 | Black, III | 338/50 |
| 5,268,665 A | * | 12/1993 | Iwao | 338/22 R |
| 5,274,351 A | * | 12/1993 | Lee | 338/221 |
| 5,291,174 A | * | 3/1994 | Zirnheld et al. | 338/24 |
| 5,712,766 A | * | 1/1998 | Feldman | 361/737 |
| 5,828,290 A | * | 10/1998 | Buss et al. | 338/162 |
| 5,859,581 A | * | 1/1999 | Morris | 338/50 |

* cited by examiner

*Primary Examiner*—Lincoln Donovan
*Assistant Examiner*—K. Lee
(74) *Attorney, Agent, or Firm*—Patrick M. Griffin

(57) ABSTRACT

An electrical resistor assembly is affixed to a blower casing of a heating, venting, and air conditioning blower motor for resisting the flow of electricity to the blower motor from an electrical circuit. The assembly includes a heat dissipater for dissipating heat generated by electrical current flowing through the circuit. A connector connects the assembly to the electrical circuit. A housing contains the dissipater and the connector. The housing includes at least one catch for fixedly attaching the assembly to the casing and includes at least one break-away element for providing access to the catch. A seal circumscribes the housing including the break-away elements for providing a leak proof mating surface between the assembly and the casing.

16 Claims, 3 Drawing Sheets

SNAP-IN BLOW MOTOR SPEED CONTROL WITH BRAKEAWAY SERVICE FEATURE

TECHNICAL FIELD

The subject invention relates to an improved housing for an electrical resistor. More specifically, the subject invention relates to an improved housing attachment for attaching the housing to a blower casing.

BACKGROUND OF THE INVENTION

A speed control for a blower motor of a heating, venting, and air conditioning system typically comprises a resistor assembly for resisting the flow of electric current to the blower motor from an electrical circuit. The most widely used type of resistor is a heat dissipater, which is affixed to a blower casing so turbulent air emitted from the blower motor can contact the dissipater. The heat dissipater absorbs energy from the electrical circuit and dissipates it in the form of heat thereby reducing the flow of electrical current to the blower motor. Electrical current is routed through the resistor via a control setting. If the setting is on high blower speed, no electrical current will be routed through the resistor. If the setting is on low blower speed, most of, or all of the current will be routed through the resistor reducing the flow of electrical current to the blower motor thereby reducing the speed of the motor. The resistor assembly includes a housing for encasing the dissipater. The housing includes a seal for providing a leak proof mating surface between the housing and the blower casing.

The housing is typically attached to the blowercasing with self tapping type screw fasteners. These screws provide a leak proof attachment between the housing and the casing. The use of screws also provides for an easy method of removing the resistor from the casing for maintenance or replacement by merely reversing the screw. However, utilizing screws as an attachment means is cost prohibitive due to assembly time and screw cost. In addition, the use of self tapping screws has proven to be an ergonomically difficult operation.

Attempts have been made to replace screws with snap-fit attachments. However, snap-fit attachments do not provide a leak proof seal between the housing and casing unless the snap-fit attachment is completely covered by the housing preventing access to the snap. Absent access to the snap, the housing can not be released from casing for maintenance and replacement.

Therefore, a need exists for snap-fit type attachment of a resistor housing to a blower casing that provides for both a leak proof seal and a for access to the snap for maintenance and replacement.

SUMMARY OF THE INVENTION

The present invention relates to an electrical resistor assembly of the type that is affixed to a blower casing of a heating, venting, and air conditioning blower motor. The resistor resists the flow of electricity to the blower motor and includes a heat dissipater for dissipating heat generated by electrical current flowing through the circuit. A connector connects the assembly to the electrical circuit. A housing encases the dissipater and the connector. The housing includes a seal for providing a leak proof mating surface between the assembly and the casing. The housing includes at least one catch for fixedly attaching the assembly to the casing and includes at least one break-away element for providing service access to the catch. The seal traverses the housing, including the catch. The catch provides for a snap-fit attachment of the resistor assembly to the blower casing. Preferably, the assembly will include opposing catches each having an associated break-away element providing access thereto.

The break-away element allows a housing configuration that completely covers the catches. Thus, the housing can include a seal that circumscribes the catches providing a leak proof mating surface with the casing. The break-away element also provides access to the catches enabling the release of the catches from the casing for maintenance or removal of the resistor assembly from the casing.

DESCRIPTION OF THE PREFERRED EMBODIMENT

Figure 1:
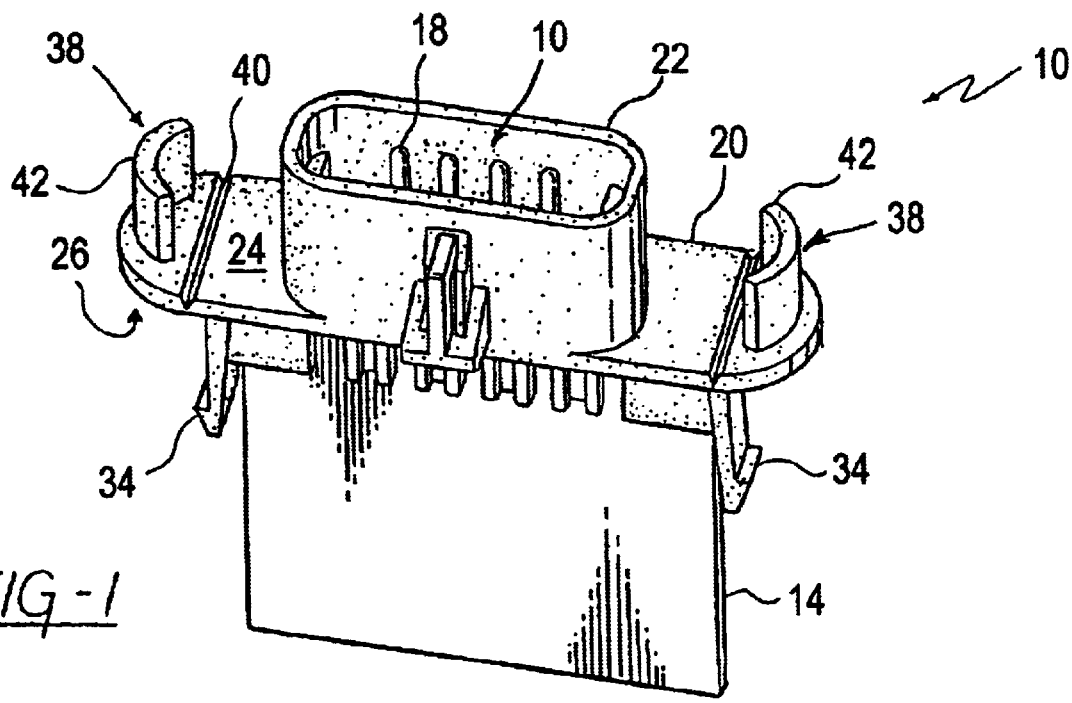
FIG. 1 is a perspective view of the subject invention.
Figure 3:
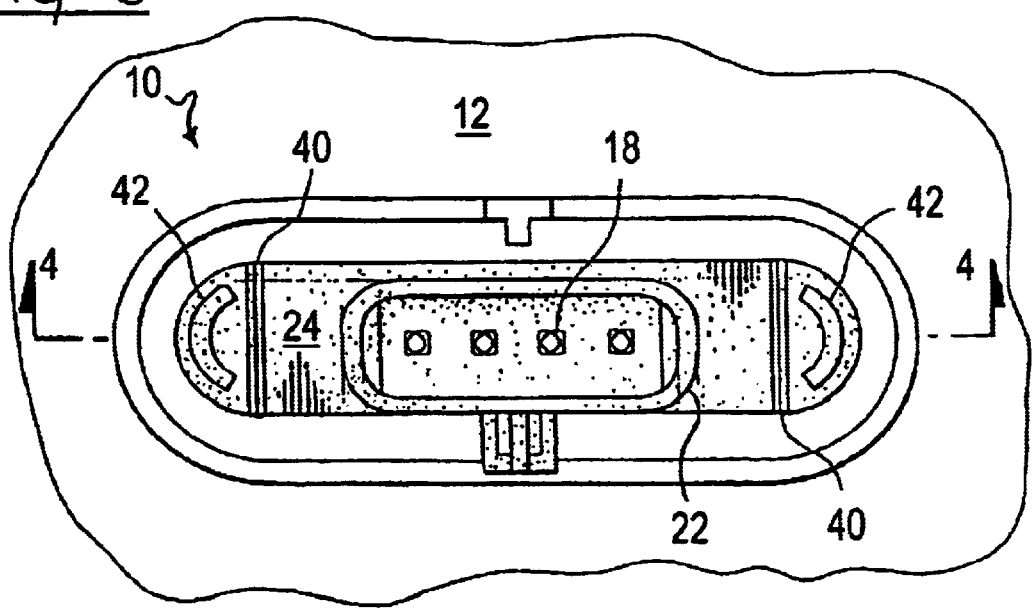
FIG. 3 is a top view of the subject invention affixed to a blower casing.
Figure 2:
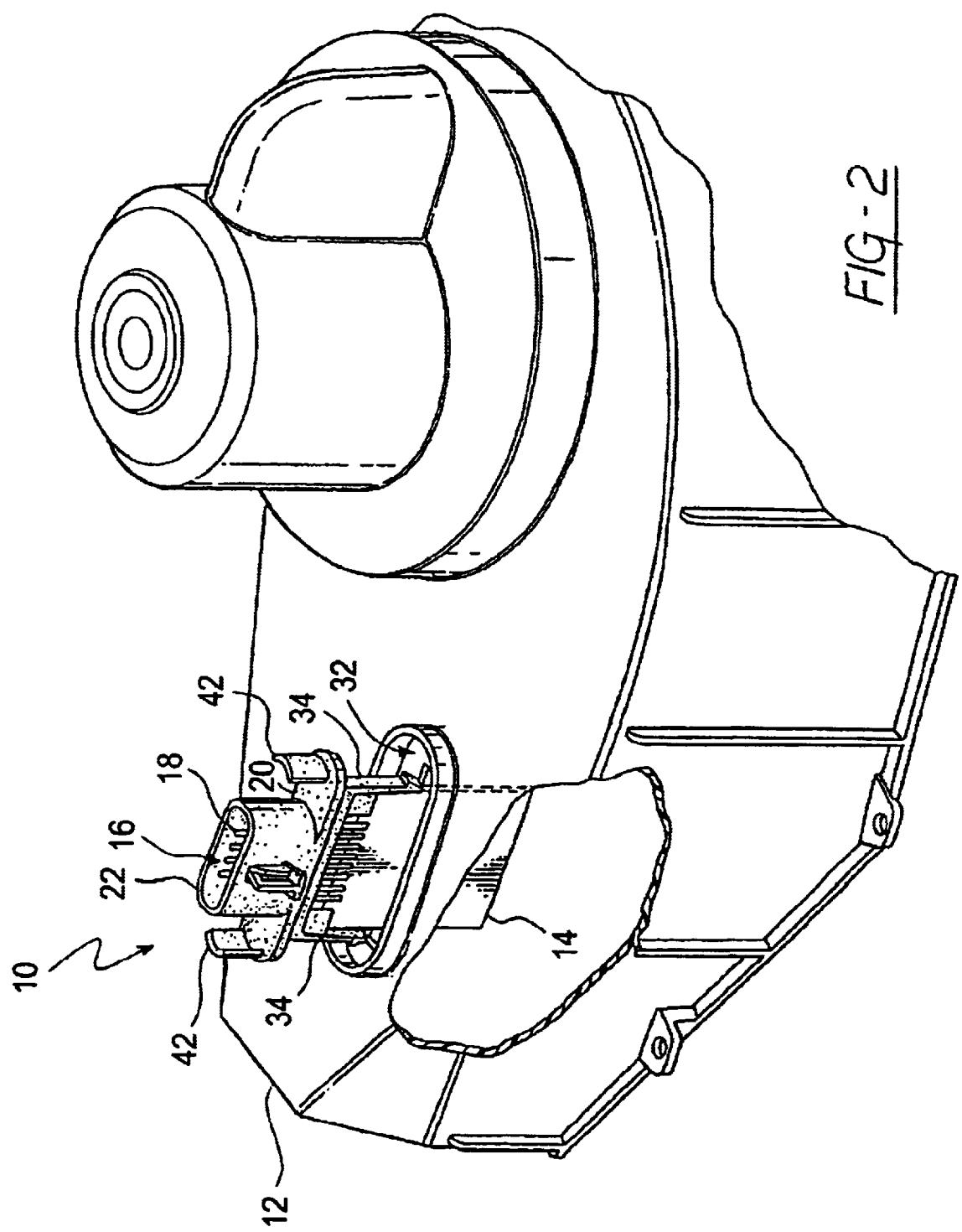
FIG. 2 is a perspective view of the subject invention being inserted into a slot disposed in a blower casing.

An electrical resistor assembly is generally shown at 10 in FIG. 1 The assembly 10 is affixed to a blower casing 12 (see FIGS. 2 and 3) of a heating, venting, and air conditioning blower motor (not shown) for resisting the flow of electricity to the blower motor from an electrical circuit (not shown). The assembly 10 includes a heat dissipater 14 for dissipating heat generated by the electrical current flowing through the circuit. It is known in the art of electrical resistors that removing heat from an electrical circuit causes the resistance to the flow of electrical current through the circuit. Therefore, a heat dissipating resistor can effectively reduce the current flowing to the motor for reducing motor speed. The heat dissipater 14 of the subject invention comprises a ceramic plate formulated to be heat conductive. However, other materials known to have good heat conductive properties may also he used.

The heat dissipater 14 is located in the air stream emitted from the blower motor. The flow of turbulent air from the blower motor across the heat dissipater 14 facilitates removal of heat from the circuit by reducing the temperature of the dissipater 14.

A connector 16 connects the assembly 10 to the electrical circuit. The connector 16 includes a plurality of pins 18 for joining the heat dissipater 14 to the electrical circuit. The pins 18 comprise electricity conducting metal and are affixed to the heat dissipater 14. The pins 18 provide contact with the electrical circuit through which the electrical current flows to the blower motor. The amount of electrical current directed through the assembly 10 is dependant upon the blower motor control setting. If the control is set for maximum blower speed, little or no current will be directed through the resistor assembly 10. If the control is set for minimum blower speed, most of the current flowing through the circuit will be directed through the resistor assembly 10, which will reduce the amount of current flowing to the blower motor resulting in a reduced motor speed. If the control is set for medium blower speed, a portion of, or all of, the current flowing through the circuit corresponding to a medium blower motor speed will be directed through the resistor.

A housing 20 encases the dissipater 14 and the connector 16. The housing 20 forms a shroud 22 around the pins 18, which project through the housing 20. Thus, the pins 18 are disposed on a circuit side 24 of the housing 20 and the dissipater 14 is disposed on a blower casing side 26 of the housing 20. The shroud 22 receives a female connector from the circuit for mating with the pins 18, which together comprise a connector 16. It should be understood that the pins 18 and female connector could be reversed with the female portion being disposed in the shroud 22.

Figure 4:
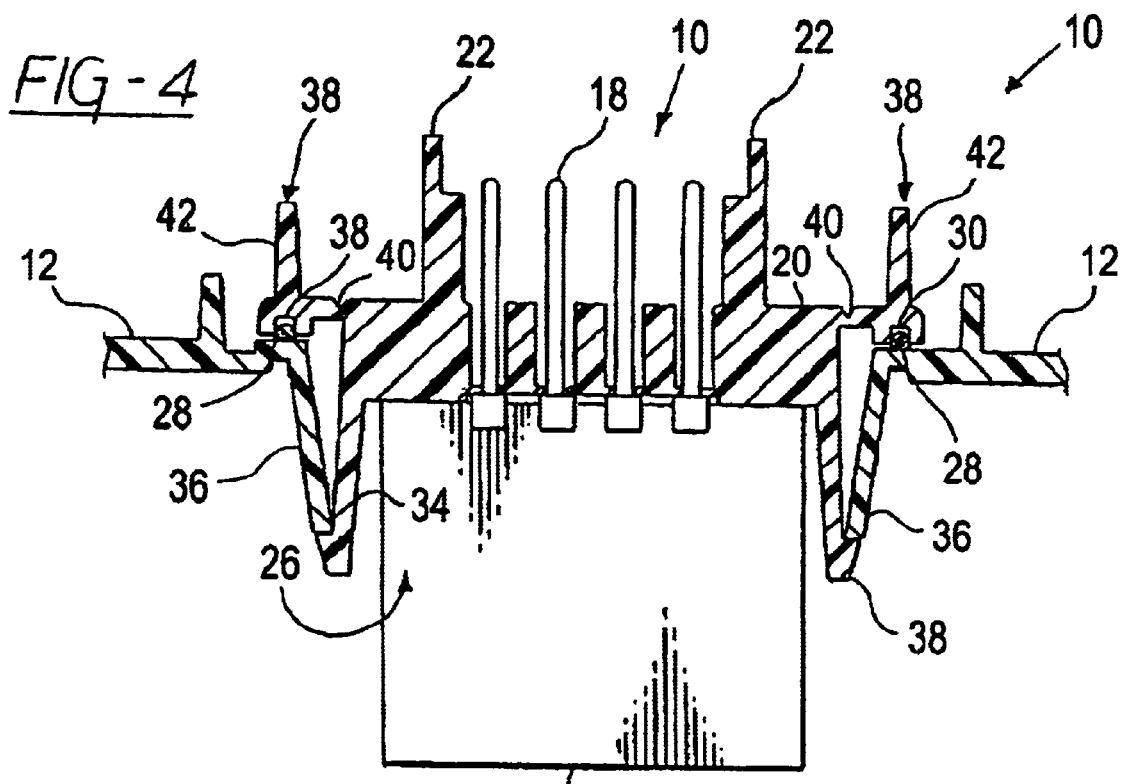
FIG. 4 is a sectional view of the subject invention along line 4—4 of FIG. 3.

A seal 28 (see FIG. 4) provides a leak proof mating surface between the assembly 10 and the casing 12. The housing 20 includes a groove 30 located on the blower casing side 26 having the seal 28 disposed therein. The blower casing 12 includes a slot 32 into which the dissipater 14 is inserted. The seal 28 prevents air from escaping out of the blower casing 12 through the slot 32, which is known to cause acoustic abnormalities such as whistling and the release of untempered air into the passenger compartment. In addition, the seal 28 prevents water from entering the blower casing 12, which would ultimately be blown into the passenger compartment.

The housing 20 includes at least one catch 34 for fixedly attaching the assembly 10 to the casing 12. The preferred embodiment includes opposing catches 34 providing the benefit of snapping the assembly 10 into the slot 32 disposed in the blower casing 12. The slot 32 includes a flange 36 onto which the opposing catches 34 clasp for retaining the assembly 10 to the casing 12. The housing 20 comprises a material more rigid than the casing 12 material. The housing 20 is contemplated to be formed of a 6,6 nylon or an equivalent for providing thermal integrity necessary to withstand heat from the dissipater 14. The 6,6 nylon provides a rigid, inflexible substrate. Therefore, the catches 34 will not flex during insertion of the assembly 10 into the slot 32. Blower casings 12 are typically formed from a filled polypropylene due primarily to the cost benefits of polypropylene over other polymers. Because polypropylene is pliant by nature, the flange 36 flexes upon insertion of the resistor assembly 10 allowing the catches 34 to clasp the flange 36.

Figure 5:
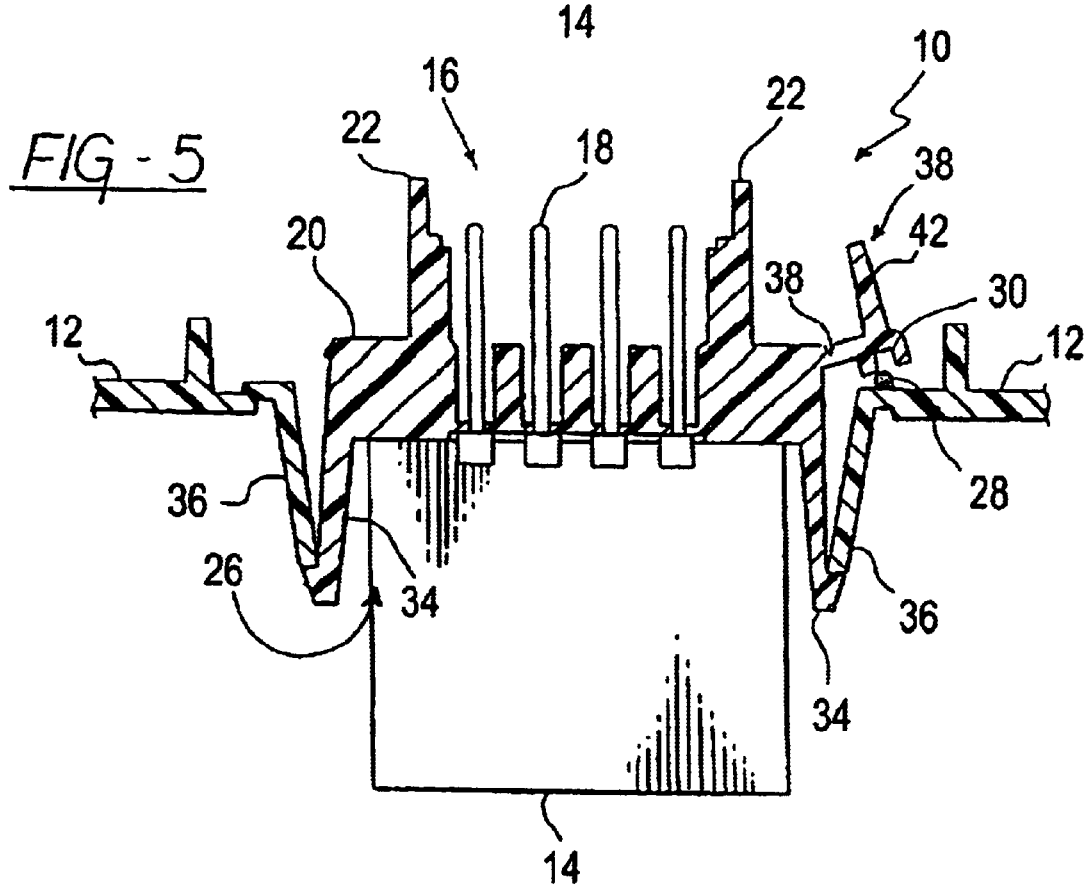
FIG. 5 is a sectional view of the subject invention along line 4—4 of FIG. 3 having the break-away elements broken away.

The housing 20 includes at least one break-away element 38 for providing access to the catches 34. Preferably, a break-away element 38 is included for each of the catches 34 for providing access to each of the catches 34. Access to the catches 34 is required for performing maintenance upon, or replacing the resistor. The resistor assembly 10 can be removed from the blower casing 12 by breaking a portion of the assembly 10 away from the assembly 10, i.e., by breaking the break-away element 38. FIG. 5 shows the break-away element 38 being broken from the housing 20. Removing the break-away element 38 from the housing 20 provides access to the catch 34.

Flexing the casing 12 or catch 34 releases the flange 36 from the catch 34 allowing for the retraction of the assembly 10 from the slot 32. The preferred method for flexing the casing 12 or catch 34 is by inserting a tool, such as a screw driver, between the catch 34 and the flange 36.

The break-away elements 38 include a notch 40 for disconnecting the break-away elements 38 from the housing 20. The notch 40 provides a weakened break point for cracking the housing 20 material. The break-away element 38 includes a tab 42 for gripping the break-away element 38 for the purpose of cracking the housing 20 material. When the break away elements 38 have been removed from the assembly 10, the catches 34 are exposed providing access for unclasping the catches 34.

The groove 30 traverses the break-away elements 38. Therefore, the seal 28 also traverses the break-away elements 38 providing the benefit of forming an enclosure that circumscribes the catches 34 preventing leakage of air or water around the catches 34.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An electrical resistor assembly of the type affixed to a blower casing of a heating, venting, and air conditioning blower motor for resisting the flow of electricity to the blower motor from an electrical circuit, said assembly including:

a connector;

a heat dissipater for dissipating heat generated by electrical current flowing through the circuit;

a housing holding said dissipater and said connector;

a seal for providing a leak proof mating surface between said assembly and the casing:

said housing including at least one catch for fixedly attaching said assembly to the casing and including at least one break-away element for providing access to said catch for releasing said catch from casing.

2. An assembly as set forth in claim 1, wherein said assembly includes a connector for connecting said assembly to the electrical circuit.

3. An assembly as set forth in claim 2, wherein said at least one break-away element includes a notch for disconnecting said at least one break-away element from said housing.

4. An assembly as set forth in claim 3, wherein said at least one break-away element includes a tab for gripping said at least one break-away element.

5. An assembly as set forth in claim 4, wherein said housing includes a groove having said seal disposed therein, said groove traversing said at least one break-away element.

6. An assembly as set forth in claim 5, wherein said connector includes a plurality of pins for joining said heat dissipater to the electrical circuit.

7. An assembly as set forth in claim 6, wherein said heat dissipater comprises a ceramic plate.

8. A housing for affixing a heat dissipating electrical resistor to a blower casing of a heating, venting, and air conditioning blower motor, said housing including:

a seal for providing a leak proof mating surface between said housing and the casing;

opposing catches for fastening said housing to the casing; and at least one break-away element for providing access to at least one of said opposing catches for releasting opposing catches from the casing.

9. An assembly as set forth in claim 8, wherein said at least one break-away element includes a notch for disconnecting said at least one break-away element from said housing.

10. An assembly as set forth in claim 9, wherein said at least one break-away element includes a tab for gripping said at least one break-away element.

11. An assembly as set forth in claim 10, wherein said housing includes a groove having said seal disposed therein, said groove traversing said at least one break-away element.

12. An assembly as set forth in claim 11, wherein said at least one break-away element comprises opposing break-away elements, said opposing break-away elements providing access to each of said opposing catches.

13. A method for removing an electrical resistor assembly affixed to a casing of a heating, venting, and air conditioning blower, wherein said assembly includes opposing catches for affixing said resistor to said casing, said method comprising:

breaking a portion of said assembly;

removing said portion from said assembly for providing access to said catches;

flexing the casing or catches for releasing the casing from said catches; and retracting said assembly from the casing.

14. A method as set forth in claim 13, wherein said step of flexing the casing or catches is further defined by inserting a tool between said catches and the casing.

15. An electrical resistor assembly of the type affixed to a blower casing of a heating, venting, and air conditioning blower motor for resisting the flow of electricity to the blower motor from an electrical circuit, said assembly including:

a connector;

a heat dissipater for dissipating heat generated by electrical current flowing through the circuit;

a housing holding said dissipater and said connector;

a seal for providing a leak proof mating surface between said assembly and the casing and being received by a groove in said housing traversing said at least one break-away element;

said housing including at least one catch for fixedly attaching said assembly to the casing and including at least one break-away element for providing access to said catch.

16. A housing for affixing a heat dissipating electrical resistor to a blower casing of a heating, venting, and air conditioning blower motor, said housing including:

a seal for providing a leak proof mating surface between said housing and the casing and being received by a groove in said housing traversing said at least one break-away element;

opposing catches for fastening said housing to the casing; and at least one break-away element for providing access to at least one of said opposing catches.

* * * * *